F. W. SMITH.
TRACTOR.
APPLICATION FILED JUNE 30, 1920.
1,371,819.
Patented Mar. 15, 1921.
4 SHEETS—SHEET 3.
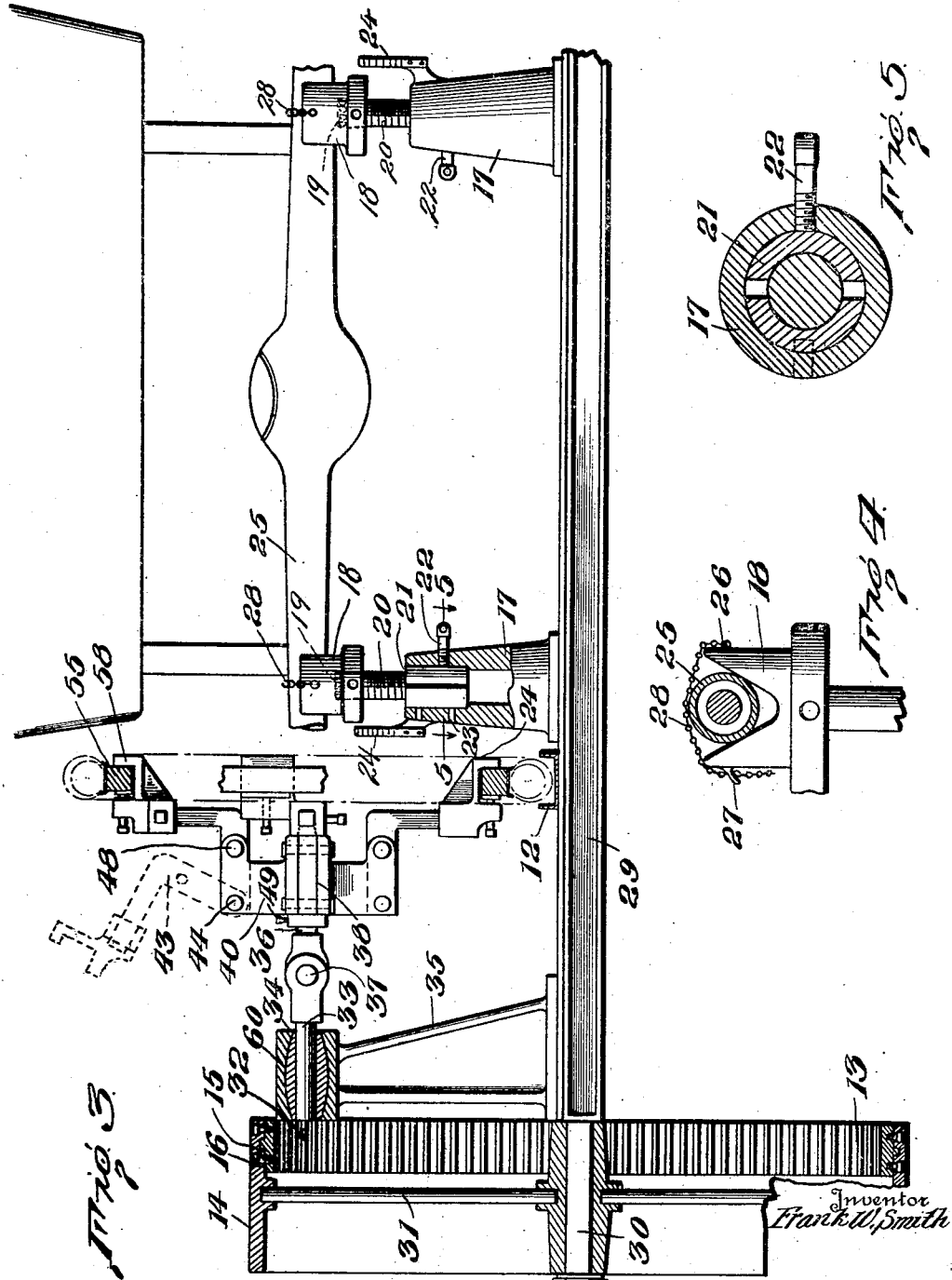

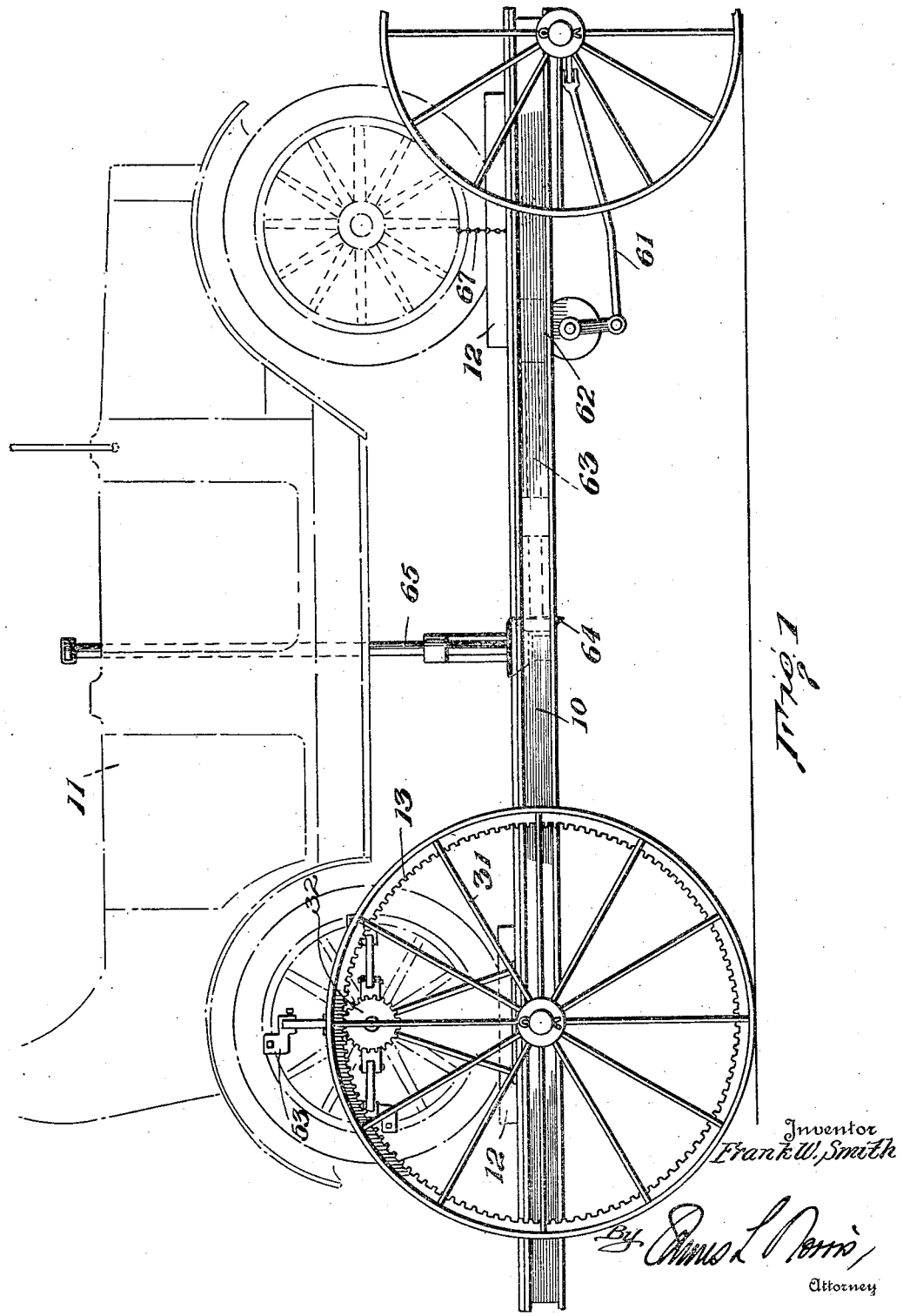

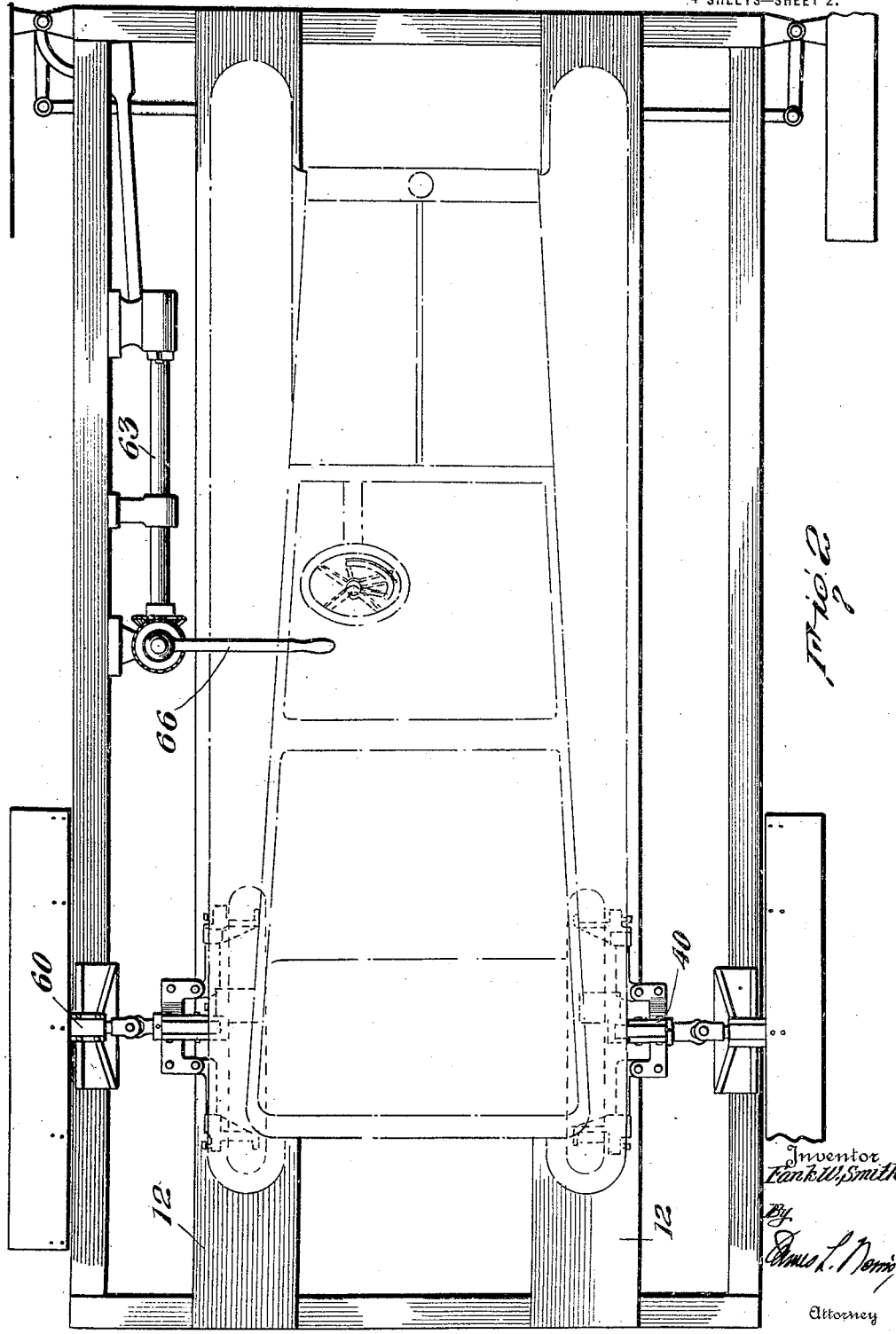

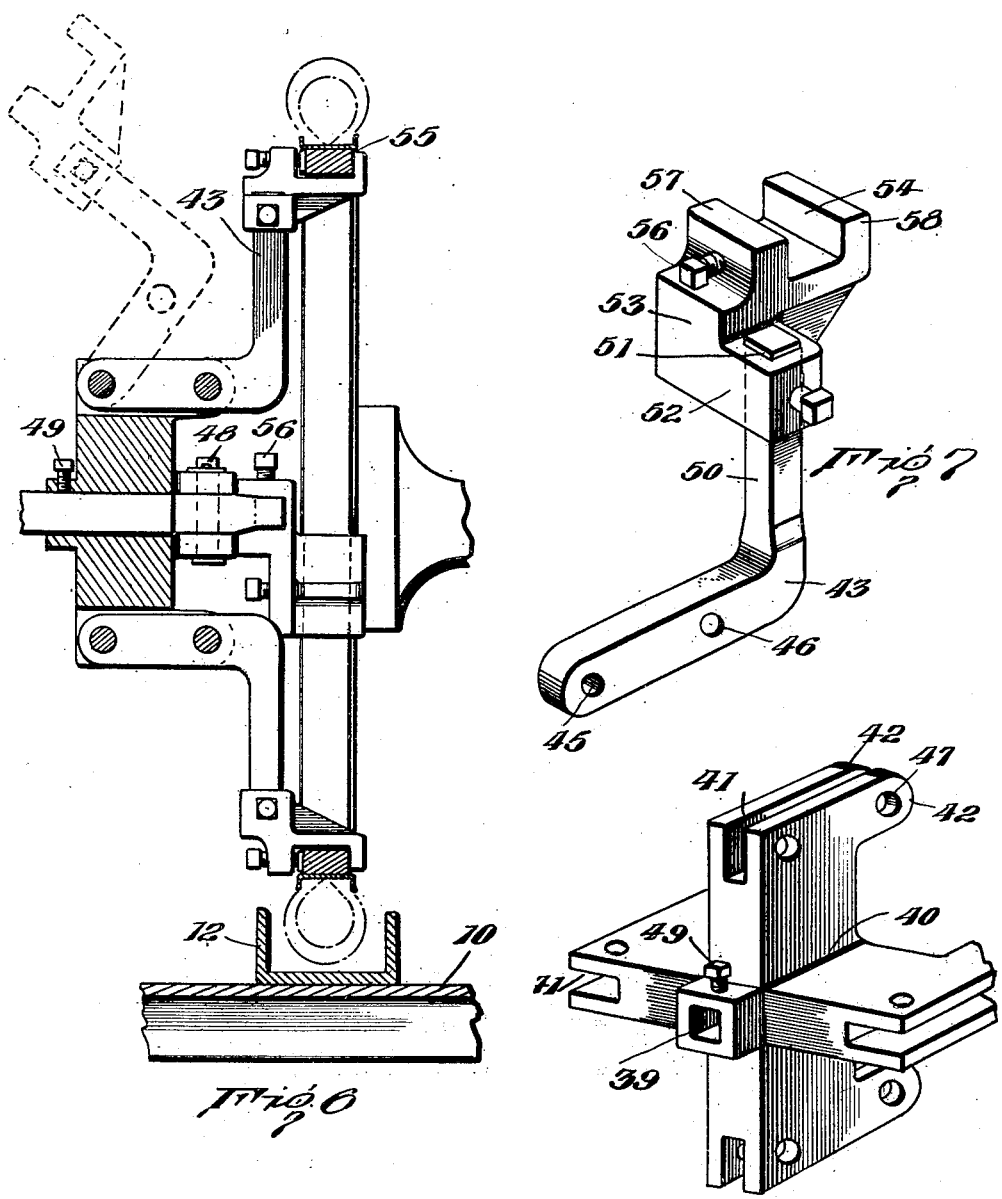

UNITED STATES PATENT OFFICE.

FRANK W. SMITH, OF BROOKLYN, NEW YORK.

TRACTOR.

1,371,819.  Specification of Letters Patent.  Patented Mar. 15, 1921.

Application filed June 30, 1920. Serial No. 393,129.

*To all whom it may concern:*

Be it known that I, FRANK W. SMITH, a citizen of the United States, residing at Brooklyn, in the county of Kings and State of New York, have invented new and useful Improvements in Tractors, of which the following is a specification.

This invention relates to an improved driving mechanism whereby a vehicle having no means of self propulsion may be driven by another vehicle such as an automobile which is mounted thereon.

The primary object of the invention is to provide a farm tractor, the driving power of which is derived from the engine of an automobile which is mounted on the frame of the tractor.

Another object of the invention is to provide a driving connection between the rear wheels of the automobile and the driving wheels of the tractor which may be readily applied and which will compensate for slight differences in alinement.

Novel details of construction and the improved operation provided by my invention will become apparent on reference to the following specification which describes the invention in connection with the accompanying drawings, illustrative of the preferred form of the invention.

In the drawings:—

Figure 1 is a side elevation of a farm tractor having an automobile mounted thereon, in accordance with my invention;

Fig. 2 is a plan view of the mechanism;

Fig. 3 is a partial rear elevation showing certain parts in section;

Fig. 4 is a detail view showing the rear axle secured to a V-block of one of the lifting jacks;

Fig. 5 is a sectional view on the line 5—5, of Fig. 3;

Fig. 6 is a detail view partially in section of a clamping mechanism;

Fig. 7 is a perspective detail view of one of the arms and the clamp associated therewith; and Fig. 8 is a detail perspective view of one of the clamp holders.

The numeral 10 designates the frame of the farm tractor or other vehicle upon which the automobile 11 is mounted. The automobile is preferably placed upon the tractor under its own power by means of skids, and the wheels of the vehicle preferably engage in longitudinally arranged channel members 12. The driving wheels of the tractor, according to my invention, are provided with a wide rim having an internal gear 13 secured to the inner periphery thereof. For convenience in the application of the internal gear to the rim of the tractor wheel, the gear is preferably made in segments adapted to be secured to the rim 14 by means of machine screws 15 which are set in recesses 16 formed on the outer periphery of the rim of the wheel so that the heads of said screws will be located below the outer circumference of the wheel.

Jacks herein designated as 17 are mounted on the frame 10 of the tractor adjacent the channel bars 12 of the rear wheels. Each jack 17 is provided with a V-block 18 having a ball-thrust bearing 19 for engaging the elevating screw 20 which is operated by an internally threaded sleeve 21 actuated by suitable gearing (not shown). A clamping screw 22 is also provided for the purpose of clamping the elevating mechanism in raised position. Each jack 17 is also provided with a sectional casing, the parts of which are secured together by means of dowel pins 23. A gage 24 projects upwardly from the casing of the jack for the purpose of indicating the height to which each side of the rear axle is raised in order to bring opposite rear wheels in substantially a straight line. Although the preferred form of a jack construction is as above described, it is to be understood that the invention is not limited to any form of jack inasmuch as any device which is capable of lifting and maintaining the rear axle 25 in elevated position may be successfully used with my improved mechanism.

The V-block 18 of the lifting jack is preferably formed with an eye 26 and a hook 27 at diametrically opposite points forming fastening means for a chain 28 which may pass over the rear axle in order to more firmly hold the same in position. However, chains passing around the rear axle 25 and secured to the frame 10 of the tractor may be provided instead of or in conjunction with the chain 28, if desired.

As shown in Fig. 3, the rear axle 29 of the farm tractor is provided with a spindle 30 having rotatably mounted thereon the rear wheel 31 having the rim 14 equipped with the internal gear 13, as above described. After the rear axle 25 of the automobile has been raised to the desired elevation, a transmission mechanism is clamped to the rear wheels thereof for the purpose of driving the rear wheels 31, of the tractor, by means of the internal gear 13 and a pinion 32 in mesh therewith.

The pinion 32 is mounted on one end of a shaft 33 which passes through a radial bearing 34 provided in a standard 35. The latter are secured to the frame of the tractor near each wheel thereof in position to support the shafts 33 in driving relation with the internal gears 13. A shaft section 36 is connected to the inner end of each shaft 33 by means of a universal joint 37. The shaft 36 is provided with a square shank 38 adapted to engage in a square opening 39 formed centrally through the clamping holder 40. As shown in Fig. 8, this holder is preferably composed of four outstanding members arranged 90° apart and provided at their outer edges with slots 41 which extend through the outer edges of said arms and are prolonged beyond the same between ears 42 which project beyond the body of the clamping holder. Arms 43 are mounted in the slots 41 and pivoted at one end to the holder 40 by means of a pin 44 which passes through alining apertures formed in the holder and an aperture 45 (see Fig. 7) near one end of the arm 43. The arm 43 is also provided with an aperture 46, which is adapted to aline under certain conditions with apertures 47 formed through the spaced ears 42 for receiving a removable pin 48. A set screw 49 is threaded through the holder 40 for adjustably securing the same upon the shank 38 of the shaft section 36.

Each of the arms 43 is bent over substantially 90° so as to form the lateral projecting square portion 50 for engaging within a square socket 51 formed in a boss 52 extending from the body 53 of a clamping dog. The body 53 is provided with a slot 54 of slightly greater width than the felly 55 of the rear wheel of the automobile and a set screw 56 is adjustably secured in one of the flanges 57 formed by the slot 54 for the purpose of clamping the felly 55 against the opposite flange 58 of the clamping dog. From this construction it will be apparent that the holder is adjustable longitudinally on the shaft section 36, the clamping dog is adjustable laterally on the projecting portion 50 of the arm 43, furthermore, the universal connection 37 allows for discrepancies in the alinement of the shafts 33 and 38, and the radial bearing 34 adjusts itself within a concave seat 60 so that pinion 32 may mesh properly with the internal gear 13.

As shown in Figs. 1 and 2 the front wheels of the tractor are steered by means of the steering arm 61, which is actuated through worm gearing 62, the shaft 63, beveled gearing 64 and a vertical steering shaft 65 having an operating handle 66 extending from the upper end thereof. The shaft 65 is laterally displaced from the channels 12 a sufficient distance to provide clearance for the passage of the automobile 11, and while the automobile is being driven upon the frame 10 of the tractor the steering arm 66 is turned longitudinally of the vehicle. When the automobile is in proper position on the vehicle, arm 66 is turned to its normal position which brings it within convenient reach of the driver's seat of the automobile so that the engine controls of the same may be conveniently operated in connection with the steering mechanism of the tractor.

In operation:—

The automobile is first driven upon the tractor, properly steered within the channels 12 and located as near as possible in alinement with the shaft sections 33. Before driving the vehicle on the tractor frame, however, the arms 43 should be placed in the position shown by dotted lines in Fig. 3. This is accomplished by removing the pins 48 and throwing the arms 47 backward about the pivot pin 44. When the rear axle 25 of the vehicle has been placed in approximately the correct position, the jacks are operated in order to lift the same to the proper height and the chains 28 are secured in place. In order to more safely secure the automobile on the tractor the chains 67 are also employed in conjunction with the front wheels, but other fastening devices such as rods and turn-buckles connecting the front axle and the frame 10 of the tractor are also within the purview of my invention. The arms 43 are returned to operative position and for this purpose the clamping dogs should first be lowered on the arm 50 which will permit them to pass under the felly of the rear wheel of the automobile. The pin 48 may now be placed in position and the clamping dogs adjusted on the arm 50 until the slot 54 engages the felly, when the screw 56 may be tightened so as to firmly clamp the felly. All of the clamping dogs are thus positioned, it being assumed that the holder 40 is properly adjusted on the shaft section 46 and secured in place by the said screw 49. The universal joint 37 compensates for slight differences in alinement and the radial bearing 34 will adjust itself so as to permit proper driving relation between the pinion 32 and the internal gear 13.

It will readily be seen that the drive will take place from the engine of the automobile through the rear axle and rear wheels to the clamping dogs and holders and shaft sections 36 and 33 to pinions 32, internal gears 13 and rear wheels 14 of the tractor, the speed ratio of the pinions 32 and gears 13 being such that the motion is communicated to the rear wheels of the tractor at greatly decreased speed.

This arrangement affords a means for driving a farm tractor or other vehicle from the engine of an automobile in such a manner that no injury is likely to occur to the mechanism of either vehicle other than that which would be experienced in the ordinary operation of the same. My invention also eliminates the necessity of an investment in the purchase and maintenance of separate power plants for farm and transportation purposes, thus reducing the amount of capital involved and securing the same results.

Having described my invention, what I claim as new and desire to secure by Letters Patent, is:—

1. Means for driving the rear wheels of a vehicle from the rear wheels of an automobile mounted thereon comprising a sectional shaft, a holder mounted on one of said sections to rotate therewith, arms pivotally secured to said holder, clamping dogs adjustably mounted on said arms for engaging the felly of one of the rear wheels of the automobile, a compensating connection between said shaft sections and gearing connecting the other of said shaft sections to the rear wheel of the driven vehicle.

2. In combination, a vehicle, an automobile mounted thereon, means for lifting the rear wheels of the automobile and retaining the same in elevated position, mechanism for transmitting the motion of said rear wheels to the driving wheels of the vehicle, said mechanism including a holder having arms pivoted thereto, means for locking said arms to the holder and clamping dogs mounted on said arms for engaging one of the rear wheels of said automobile.

3. In combination with the driving wheel of a motor vehicle, means for lifting and retaining said wheel in elevated position, a standard having a radial bearing mounted therein, a shaft journaled in said radial bearing, a shaft section having a universal joint connection with one end of said shaft, clamping means rotatably connecting said shaft section with said driving wheel, said clamping means being adjustable in two directions substantially at right angles with each other, and gearing connected to the other end of said shaft for communicating motion to the driven mechanism.

4. In a mechanism for transmitting motion from the rear wheel of an automobile to a driven mechanism, a shaft, a holder mounted to rotate with said shaft, said holder having angularly spaced slotted members, arms pivoted at one end to said members and adapted when in operative position to engage the slots of said members, means for locking said arms when in operative position to the members, clamping dogs adjustably mounted on said arms for engaging said wheel, and gearing connecting said shaft and the driven mechanism.

5. In a mechanism for transmitting motion from the rear wheel of an automobile to a driven mechanism, a holder having arms pivoted thereto, said holder and arms having alining apertures formed therein, pins adapted to pass through said apertures for locking the arms in operative position, each of said arms having a laterally projecting portion, and a clamping dog adjustably mounted on each portion engaging the felly of said rear wheel.

In testimony whereof I have hereunto set my hand in presence of two subscribing witnesses.

FRANK W. SMITH.

Witnesses:
  NORMAN A. GIRARD,
  R. BRUCE GORDON.